us007730157B2

(12) United States Patent
Baratto et al.

(10) Patent No.: US 7,730,157 B2
(45) Date of Patent: Jun. 1, 2010

(54) METHODS, MEDIA, AND SYSTEMS FOR DISPLAYING INFORMATION ON A THIN-CLIENT IN COMMUNICATION WITH A NETWORK

(75) Inventors: Ricardo Baratto, New York, NY (US); Jason Nieh, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 767 days.

(21) Appl. No.: 11/221,475

(22) Filed: Sep. 8, 2005

(65) Prior Publication Data

US 2006/0184614 A1    Aug. 17, 2006

Related U.S. Application Data

(60) Provisional application No. 60/649,480, filed on Feb. 3, 2005.

(51) Int. Cl.
*G06F 15/16* (2006.01)
*G06F 3/00* (2006.01)
(52) U.S. Cl. ...................................... 709/217; 719/324
(58) Field of Classification Search ................. 709/204, 709/201–203, 217–219, 238–244; 370/229–240
See application file for complete search history.

(56) References Cited

U.S. PATENT DOCUMENTS 5,335,321 A * 8/1994 Harney et al. ............... 345/503

6,104,392 A 8/2000 Shaw et al.
6,601,087 B1 * 7/2003 Zhu et al. .................... 709/205
2002/0038338 A1 * 3/2002 Yen et al. .................... 709/203

OTHER PUBLICATIONS (Mark Andrew Seltzer, Citrix VideoFrame Delivers Streaming Video to Thin Clients, www.networkcomputing.com, Apr. 17, 2000).*
(Richard Smith, Characterising Sun Ray Thin Client Performance, Sun Microsystems, Sep. 3, 2004).*

(Continued)

*Primary Examiner*—Joseph E Avellino
*Assistant Examiner*—Afshawn Towfighi
(74) *Attorney, Agent, or Firm*—Wilmer Cutler Pickering Hale and Dorr LLP

(57) ABSTRACT

A method and system are provided for executing an application remotely on a server computer for a client computer in a computer network. The server receives at user input from the client computer associated with the application, and executes the application. The server processes display commands of the application to generate display primitives, and translates the display primitives into lower level display commands defining display updates using semantic information of the display primitives. The lower level display commands are selected from a predetermined set of lower level display commands. The lower level display commands are aggregated and ordered into one or more command queues. Each command queue is associated with a given display region. The server computer transmits the lower level display commands in the one or more command queues over the network to the client computer. The client computer is capable of translating the lower level display commands into hardware calls for causing the client computer to display the display updates.

37 Claims, 3 Drawing Sheets

OTHER PUBLICATIONS

100x100 Clean Slate Project, http://100x100network.org.
"802.11 Wireless LAN Performance," Atheros Communications, 2003.
Ausbeck, P., "A Streaming Piecewise-Constant Model," Data Compression Conference, IEEE, Mar. 1999.
Baratto, R., et al., "MobiDesk: Mobile Virtual Desktop Computing," 10th Annual ACM Internatinoal Conference on Mobile Computing and Networking, Sep.-Oct. 2004.
Charon Systems, http://www.charon.com.
Christiansen, B., et al., "Fast Motion Detection for Thin Client Compression," Data Compression Conference, IEEE, Apr. 2002.
Christiansen, B., et al., "A Novel Codec for Thin Client Computing," Data Compression Conference, IEEE, Mar. 2000.
Christiansen, B., et al., "Streaming Thin Client Compression," Data Compression Conference, Data Compression Conference, IEEE, Mar. 2001.
Chun, B., et al., "PlanetLab: An Overlay Testbed for Broad-Coverage Services," ACM SIGCOMM Computer Communications Review, Jul. 2003.
Citrix Metaframe, http://www.citrix.com.
Tynan, D., "Think Thin," Infoworld, Jul. 2005.
Fant, K., "A Nonaliasing, Real-Time Spatial Transform Technique," Theseus Research, Inc., 2002.
Fog Creek Copilot, http://www.copilot.com.
Gilbert, J., et al., "A Lossless 2-D Image Compression Technique for Synthetic Discrete-Tone Images.", IEEE, Apr. 1998.
GoToMyPC., http://ww.gotomypc.com.
Humphreys, G., et al., "Chromium: A stream-processing framework for interactive rendering on clusters," 29th International Conference on Computer Graphics and Interactive Techniques, 2002.
i-Bench, i-Bench version 1.5, http://estestinglabs.com/benchmarks/i-bench/default.asp.
Packard, K., "An LBX Postmortem," http://keithp.com/~keithp/talks/lbxpost/paper.html.
Lai, A., et al., "Limits of Wide-Area Thin-Client Computing," Sigmetrics, Jun. 2002.
Lai, A., et al., "Improving Web Browsing on Wireless PDAs Using Thin-Client Computing," WWW2004, May 2004.
LapLink, LapLink 2000 User's Guide, 1999.
Nieh, J., et al., "A Comparison of Thin-Client Computing Architectures," Technical Report CUCS-022-00, Columbia University, Nov. 2000.
Nieh, J., et al., "Measuring Thin-Client Performance Using Slow-Motion Benchmarking," ACM Transactions on Computers, Feb. 20003.
Nomachine NX, http://nomachine.com.
Pike, R., et al., "Plan 9 from Bell Labs," Computing Systems, 1995.
Portable Network Graphics (PNG), http://libpng.org/pub/png/.
Porter, T., et al., "Compositing Digital Images," Computer Graphics, ACM, 1984.
Richardson, T., et al., "Virtual Network Computing," IEEE Internet Computing, 1998.
Runaware.com, http://runaware.com.
"Tarantella Web-Inabling Software: The Adaptive Internet Protocol," SCO Technical White Paper, Dec. 1998.
Scheifler, R., et al., "The X Window System," ACM Transactions on Graphics, Apr. 1986.
Schmidt, B., et al., "The interactive performance of SLIM: a stateless, thin-client architecture," ACM Symposium on Operating System Principles, Dec. 1999.
PC Anywhere, http://www.pcanywhere.com.
Sharma, D., "Thin-Client market to fatten up, IDC says," CNET Networks, 2003.
Truman, T., et al., "The InfoPad Multimedia Terminal: A Portable Device for Wireless Information Access," IEEE, 1998.
SGI OpenGL Vizserver, http://www.sgi.com/software/vizserver/, 1993-2005.
"Virtual Network Computing," http://www.realvnc.com, 2002-2005.
Wong, A., et al., "Operating System Support for Multi-User, Remote Graphical Interaction," USENIX, 2000.
"X Web FAQ," http://www.broadwayinfo.com/bwfaq.htm, 1997.
Yang, S., et al., "The Performance of Remote Display Mechanisms for Thin-Client Computing," USENIX Annual Technical Conference, Jun. 2002.
"Sun Ray Overview—White Paper," Sun Microsystems, Inc., Dec. 2004.

* cited by examiner

METHODS, MEDIA, AND SYSTEMS FOR DISPLAYING INFORMATION ON A THIN-CLIENT IN COMMUNICATION WITH A NETWORK

RELATED APPLICATION

The present application is based on and claims priority from U.S. Provisional Patent Application Ser. No. 60/649,480 filed on Feb. 3, 2005 and entitled "Remote Display Architecture For Thin-Client Computing," which is incorporated herein by reference in its entirety.

BACKGROUND OF THE INVENTION

1. Field of the Invention

The present invention relates generally to network computing and, more particularly, to a virtual display architecture for thin-client network computing.

2. Description of Related Art

In the last two decades, the centralized computing model of mainframe computing has shifted toward the more distributed model of desktop computing. However, as these personal desktop computers become prevalent in today's large corporate and government organizations, the total cost of owning and maintaining them is becoming unmanageable.

The use of mobile laptops and handheld devices to store and process information poses additional administration and security issues. These devices often contain sensitive data that must be carefully secured, yet the devices themselves often travel in insecure environments where they can be easily damaged, lost, or stolen. This management and security problem is particularly important for the medical community, given the increasing use of computing in medicine, the urgent need to comply with HIPAA regulations, and the significant privacy consequences for lost patient data.

Thin-client computing offers a solution to the rising management complexity and security hazards of the current computing model by leveraging continued improvements in network bandwidth, cost, and ubiquity to return to a more centralized, secure, and easier-to-manage computing strategy. A thin-client computing system includes a server and a client that communicate over a network using a virtual display protocol. The protocol allows graphical displays to be virtualized and served across a network to a client device, while application logic is executed on the server. Using the virtual display protocol, the client transmits user input to the server, and the server returns screen updates of the user interface of the applications to the client.

The thin-client approach offers several significant advantages over traditional desktop computing. Clients can be essentially stateless appliances that do not need to be backed up or restored, require little maintenance or upgrades, and generally do not store any sensitive data that can be lost or stolen. Mobile users can access the server from generally any client and obtain the same persistent, personalized computing environment. Server resources can be physically secured in protected data centers and centrally administered, with all the attendant benefits of easier maintenance and cheaper upgrades. Computing resources can be consolidated and shared across many users, resulting in more effective utilization of computing hardware.

The remote display functionality used in thin client computing systems to decouple display from application execution over a network enables remote users to travel and access their full desktop computing environment from generally anywhere. Applications written for one platform can be generally remotely displayed on a completely different one without rewrite. Scientists, e.g., can gain full access at their desktops to specialized computer-controlled scientific instrumentation located at remote locations. Since display output can be arbitrarily redirected and multiplexed over the network, screen sharing among multiple clients becomes possible. Thus, groups of users distributed over large geographical locations can seamlessly collaborate using a single shared computing session. Furthermore, by mirroring local display output and redirecting it over the network, quick technical support can be provided with the ability to see what the user sees on the desktop, enabling problems to be diagnosed and corrected more quickly. In addition, virtualized computing infrastructure such as virtual machines can leverage remote display systems to avoid display device dependencies, further decoupling their execution from underlying hardware.

However, thin-client computing faces a number of technical challenges before it can achieve mass acceptance. One challenge is to provide a high fidelity visual and interactive experience for end users across the vast spectrum of graphical and multimedia applications commonly found on the computing desktop. While previous thin-client approaches have focused on supporting office productivity tools in local area network (LAN) environments and reducing data transfer for low bandwidth links such as ISDN and modem lines, they do not effectively support more display-intensive applications such as multimedia video, and they are not designed to operate effectively in higher latency wide area network (WAN) environments. WAN performance is particularly important given the growing number of thin-client application service providers (ASPs) attempting to provide desktop computing services over the Internet.

BRIEF SUMMARY OF EMBODIMENTS OF THE INVENTION

In accordance with one or more embodiments of the invention, a method is provided of executing an application remotely on a server computer for a client computer in a computer network. The server computer receives user input associated with the application from the client computer. The server computer executes the application, which includes processing display commands of the application to generate display primitives, and translating the display primitives into lower level display commands defining display updates using semantic information of the display primitives. The lower level display commands are selected from a predetermined set of lower level display commands. The server computer also aggregates a plurality of translated lower level display commands and orders the plurality of lower level display commands into one or more command queues. Each command queue is associated with a given display region. The server computer transmits the lower level display commands in the one or more command queues over the network to the client computer. The client computer is capable of translating the lower level display commands into hardware calls for causing the client computer to display the display updates.

In accordance with one or more further embodiments of the invention, a network computing system is provided for executing an application remotely on a server computer for a client computer in a computer network. The system includes a server computer and one or more client computers communicating over a computer network. The server computer receives user input associated with the application from one of the one or more client computers. The server computer includes a window system for processing display commands of the application to generate display primitives. The server computer also includes a virtual display driver for translating the display primitives into lower level display commands defining display updates using semantic information of the display primitives. The lower level display commands are selected from a predetermined set of lower level display commands. The server computer also includes a command scheduler for aggregating a plurality of lower level display commands translated by the virtual display driver and ordering said plurality of lower level display commands into one or more command queues. Each command queue is associated with a given display region. The lower level display commands in the one or more command queues are transmitted to the client over the network to the one of the one or more client computers. The client computer is capable of translating the lower level display commands into hardware calls for causing the client computer to display the display updates.

In accordance with one or more further embodiments of the invention, a method is provided of executing an application remotely on a server computer for a client computer in a computer network. The server computer receives user input associated with the application from the client computer. The server computer determines video hardware capabilities of the client computer. The server computer executes the application and encodes video commands of the application in accordance with the video hardware capabilities of the client computer. The server computer transmits the encoded video commands over the network to the client computer. The client computer processes the encoded video commands using the video hardware capabilities of the client computer into one or more hardware calls for causing the client computer to display video associated with said video commands.

In accordance with one or more further embodiments of the invention, a server computer is provided for use in a network computing system for executing an application remotely for a client computer in a computer network. The server computer includes a server input for receiving user input from one of the one or more client computers over the computer network. The user input is associated with the application. The server computer also includes a window system for processing display commands of the application to generate display primitives. A virtual display driver is included in the server computer for translating the display primitives into lower level display commands defining display updates using semantic information of the display primitives. The lower level display commands are selected from a predetermined set of lower level display commands. The server computer also includes a command scheduler for aggregating a plurality of lower level display commands translated by the virtual display driver and ordering said plurality of lower level display commands into one or more command queues. Each command queue is associated with a given display region. A server output transmits the lower level display commands in the one or more command queues over the network to the one of the one or more client computers. The client computer is capable of translating the lower level display commands into hardware calls for causing the client computer to display the display updates.

These and other features will become readily apparent from the following detailed description wherein embodiments of the invention are shown and described by way of illustration. As will be realized, the invention is capable of other and different embodiments and its several details may be capable of modifications in various respects, all without departing from the invention. Accordingly, the drawings and description are to be regarded as illustrative in nature and not in a restrictive or limiting sense with the scope of the application being indicated in the claims.

DETAILED DESCRIPTION OF PREFERRED EMBODIMENTS

Figure 1:
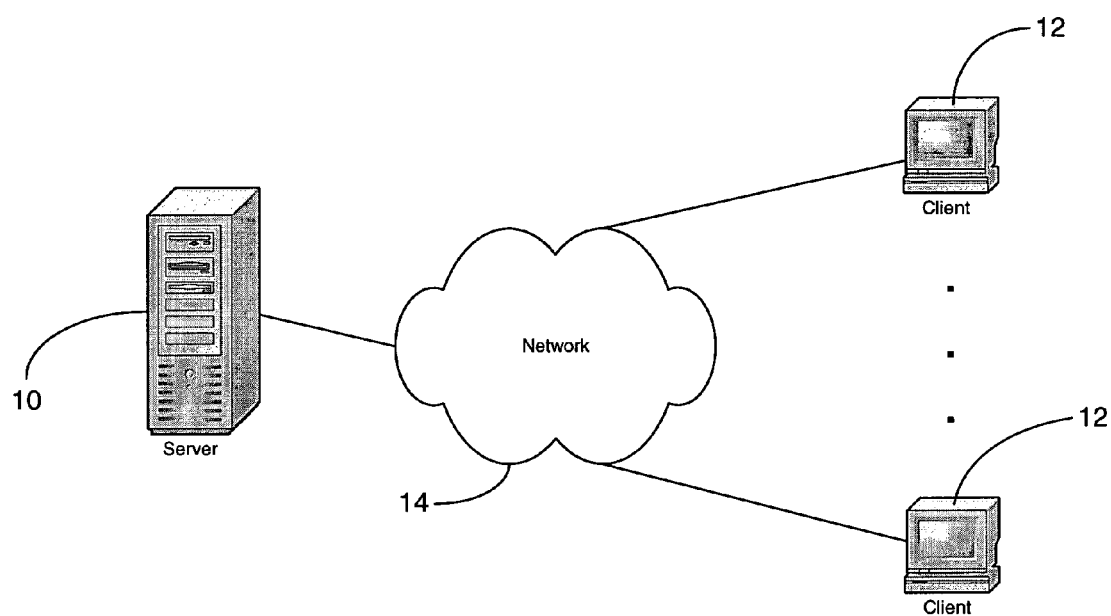
FIG. 1 is a schematic diagram of a thin-client network computing system in accordance with one or more embodiments of the invention.

FIG. 1 illustrates a thin-client computing system in accordance with one or more embodiments of the invention. The system includes a server computer 10 and a plurality of client computers 12 that communicate over a network 14 using a virtual display protocol. The protocol allows graphical displays to be virtualized at the server 10 and served across the network 14 to client computers 12, while application logic is executed on the server computer 10. Using the virtual display protocol, the client computers 12 transmit user input to the server 10, and the server 10 returns screen updates of user interfaces of applications to the client computers 12.

The network 14 can be any type of computer network including, e.g., LANs and WANs (including the Internet). The client computers 12 can be a variety of client devices including, e.g., workstations, personal computers, and mobile devices.

As will be described in further detail below, the virtual display architecture for thin-client computing systems in accordance with one or more embodiments of the invention can provide high fidelity display and interactive performance in both LAN and WAN environments. The thin-client computing system can leverage the standard video display driver interface, a well-defined, low-level, device-dependent layer that exposes the video hardware to the display system. Instead of providing a real device-specific driver for a particular display hardware, the system uses a virtual display driver at the server that intercepts drawing commands at the device layer, packetizes them, and sends them over the network to a client device to display. Using a standard interface enables the thin-client computing system to work generally seamlessly with existing unmodified applications, window systems, and operating systems. As a result, thin-client computing systems in accordance with one or more embodiments of the invention can avoid reimplementing existing display functionality in window servers and can leverage any continuing advances in window server technology.

As will also be described in further detail below, in accordance with one or more embodiments of the invention, the thin-client computing system's virtual display protocol includes a small set of efficient low-level commands that mirror the video display driver interface and are easy to implement and accelerate using widely-available commodity client video hardware. The thin-client computing system avoids the complexity and overhead of directly implementing higher-level graphics commands used by applications. Instead, it transparently maps them to its protocol command set. This can be done by taking advantage of information available at the video display driver interface and using transformation optimizations such as offscreen drawing awareness and native video support. These transformations can encode display updates in a manner that is more computationally and bandwidth efficient than compression-based approaches.

Thin-client computing systems in accordance with one or more embodiments of the invention partition functionality between the client and server using low-latency mechanisms to provide fast performance even in high latency WAN environments. In accordance with one or more embodiments of the invention, the system can introduce a shortest-job-first display command scheduling to improve response time for interactive applications, a low latency push display update model that reduces synchronization costs between client and server, and a non-blocking drawing pipeline that can integrate well with and improve the performance of single-threaded window servers. The thin-client computing system can also provide server-side screen scaling, which can reduce display bandwidth and processing requirements for small display handheld devices.

System Architecture and Protocol

Figure 2:
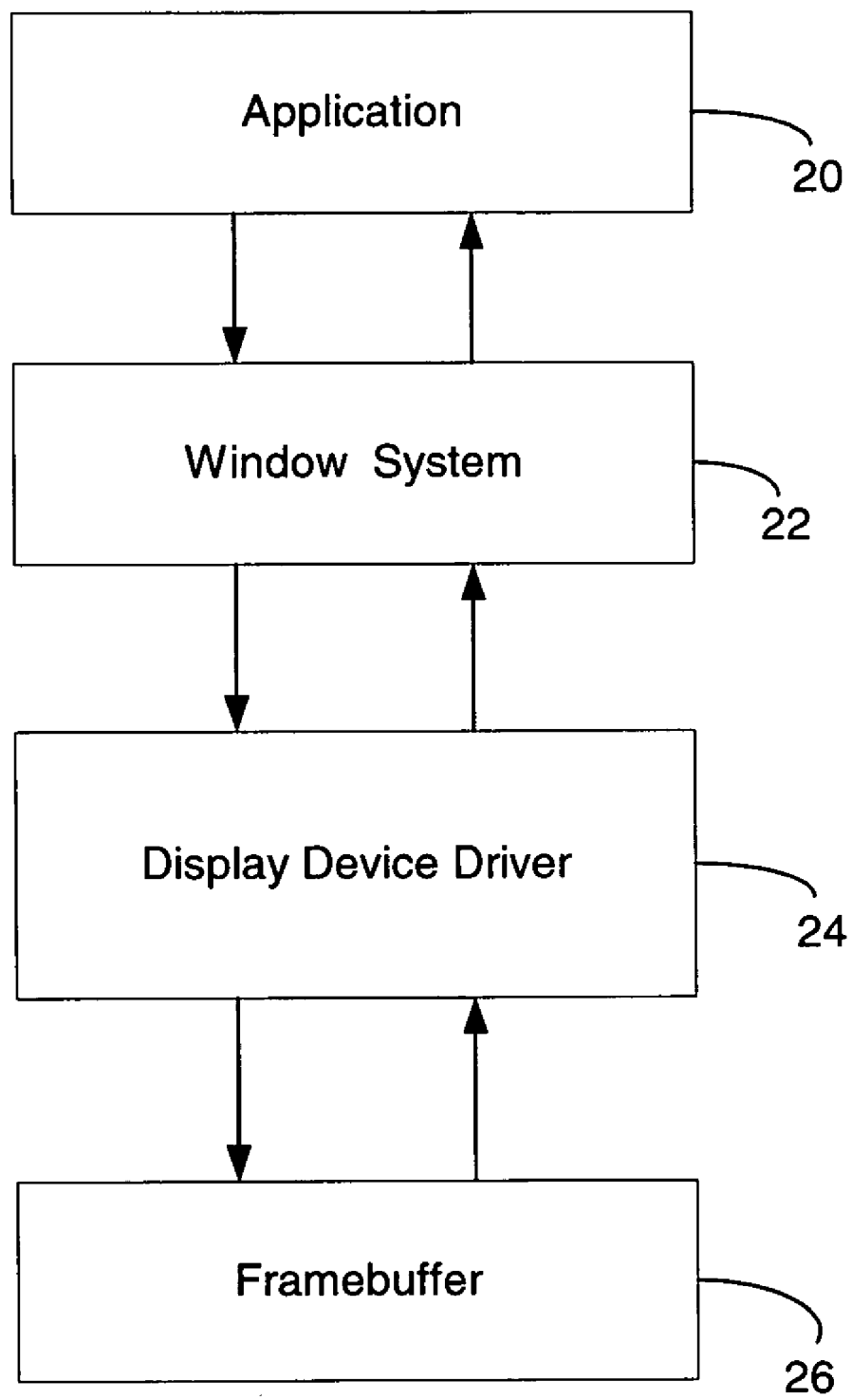
FIG. 2 is a schematic diagram illustrating the processing of display commands in a stand-alone computer in accordance with the prior art.

For purposes of comparison, the processing of display commands of an application in a conventional stand-alone computer is illustrated in FIG. 2. Display commands of an application 20 are processed by a window system 22, which includes a window library and window server. The window system 22 uses the window library to generate display primitives from the display commands of the application. The display primitives are then processed at a video device abstraction layer by a display device driver 24, which converts the display primitives into pixel data representing a display update of the user interface of the application. The pixel data is sent to a frame buffer 26, which stores the pixel data sent to the computer monitor.

Figure 3:
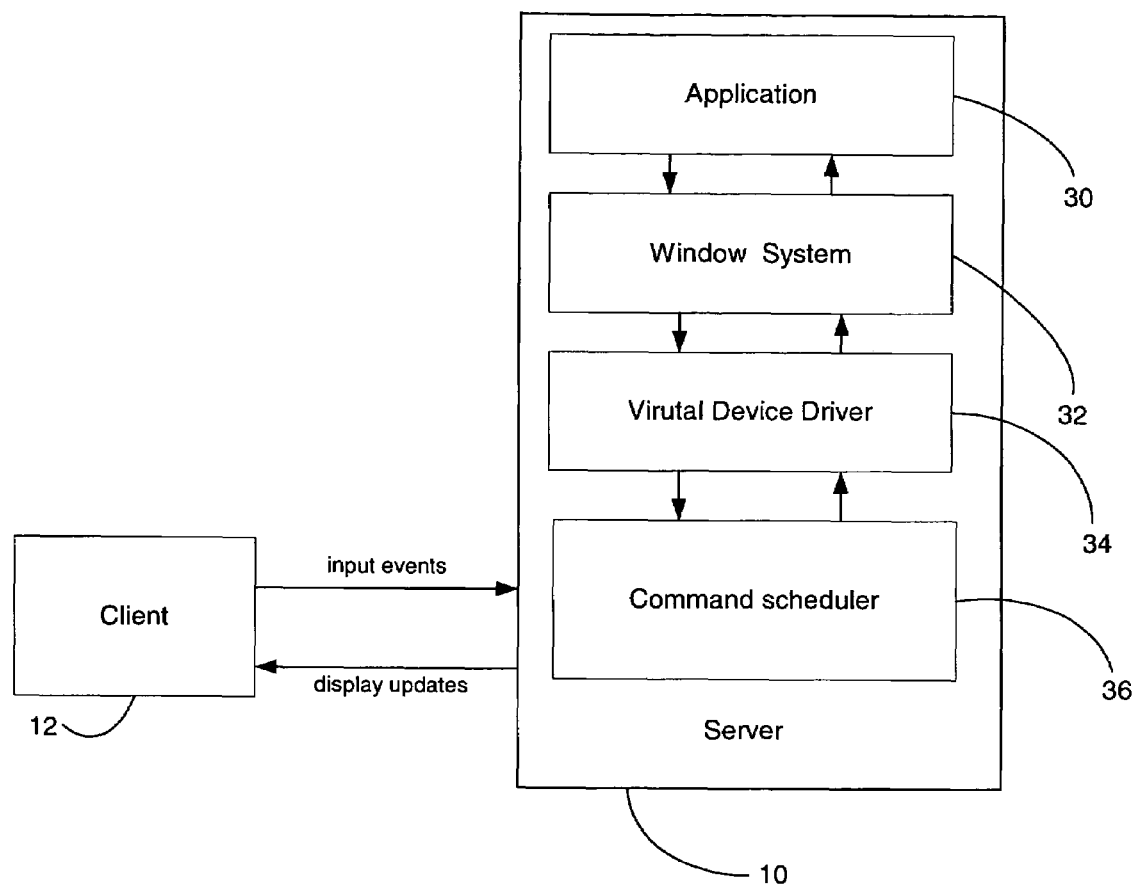
FIG. 3 is a schematic diagram illustrating the processing of display commands in a thin-client computing system in accordance with one or more embodiments of the invention.

FIG. 3 generally illustrates the processing of display commands in a thin-client computing system in accordance with one or more embodiments of the invention. An application 30 is executed by the server 10. A client 12 transmits user input to the server 10 over a network 14, and the server 10 returns screen updates of a user interface of the application 30 to the client 12 using a virtual display protocol in accordance with one or more embodiments of the invention.

Display commands from the application 30 are processed by the window system 32, which generates display primitives from the display commands. Using a virtual device driver 34, the system in accordance with one or more embodiments of the invention virtualizes the display at the video device abstraction layer, which sits below the window server and above the frame buffer. This is a well defined, low-level, device-dependent layer that exposes the video hardware to the display system. The layer is typically used by implementing a device-specific display driver that enables the use of a particular display hardware implementation. The thin-client computing system in accordance with one or more embodiments of the invention instead uses a virtual display driver 34, which intercepts drawing commands at the device layer and translates the commands to lower level display commands. A command scheduler 36 orders the lower level display commands in one or more command queues. The server then sends commands in the one or more queues over the network 14 to a client device 12 to display.

Thin-client computing systems in accordance with one or more embodiments of the invention can offer one or more of the following advantages. First, because the display device layer sits below the window server proper, the system can avoid reimplementing display system functionality already available, resulting in a simpler system that can leverage existing investments in window server technology.

Second, in accordance with one or more embodiments of the invention, using a standard interface enables the thin-client computing system to work generally seamlessly with existing unmodified applications, window systems, and operating systems. In particular, thin-client computing systems in accordance with one or more embodiments of the invention can operate within unmodified window servers, avoiding the need to maintain and update its own window server code base.

Third, thin-client computing systems in accordance with one or more embodiments of the invention can support new video hardware features with generally the same amount of work necessary to support them in traditional hardware-specific display drivers.

Fourth, since the video device driver layer still provides semantic information regarding application display commands, thin-client computing systems in accordance with one or more embodiments of the invention can utilize those semantics to encode application commands and transmit them from the server to the client in a manner that is both computationally and bandwidth efficient.

Given the thin-client computing system's virtual display approach, a small set of low-level display commands can be used for encoding display updates that mirror a subset of the video display driver interface. A preferred set of five commands used in the thin-client computing system's display protocol are listed in the table below. It should be noted that additional and/or different commands can also be used.

| Command | Description |
| --- | --- |
| RAW | Display raw pixel data at a given location |
| COPY | Copy frame buffer area to specified coordinates |
| SFILL | Fill an area with a given pixel color value |
| PFILL | Tile an area with a given pixel pattern |
| BITMAP | Fill a region using a bitmap image |

These commands are generally ubiquitously supported, simple to implement, and easily portable to a range of environments. They generally mimic operations commonly found in client display hardware and represent a subset of operations accelerated by many graphics subsystems. Graphics acceleration interfaces such as XAA and KAA for X and Microsoft Windows' GDI Video Driver interface use a set of operations that can be synthesized using these commands.

In this manner, clients need only translate protocol commands into hardware calls, and servers avoid the need to do full translation to actual pixel data, reducing display processing latency.

The command RAW can be used to transmit unencoded pixel data to be displayed verbatim on a region of the screen. This command is invoked generally as a last resort if the server is unable to employ any other command. This command may be compressed to mitigate its impact on the network.

The command COPY instructs the client to copy a region of the screen from its local frame buffer to another location. This command can improve the user experience by accelerating scrolling and opaque window movement without having to resend screen data from the server.

SFILL, PFILL, and BITMAP are commands that paint a fixed-size region on the screen. They are useful for accelerating the display of solid window backgrounds, desktop patterns, backgrounds of web pages, text drawing, and certain operations in graphics manipulation programs. SFILL can fill a sizable region on the screen with a single color. PFILL can replicate a tile over a screen region. BITMAP can perform a fill using a bitmap of ones and zeros as a stipple to apply a foreground and background color.

In accordance with one or more embodiments of the invention, for high fidelity display, all commands can be designed to support full 24-bit color as well as an alpha channel, a feature not supported by thin-client systems that execute the graphical user interface of applications on the server. The alpha channel enables the system to support graphics compositing operations and work with more advanced window system features that depend on these operations, such as anti-aliased text. Although graphics compositing operations have been used in the 3D graphics world for some time, only recently have they been used in the context of 2D desktop graphics. As a result, there is currently a dearth of support for hardware acceleration of these operations, particularly with low-end 2D only cards commonly used in more modest machines. Thin-client computing systems in accordance with one or more embodiments of the invention can provide support for graphics composition by leveraging available client hardware acceleration support only when present. In its absence, the thin-client computing system's virtual device driver approach allows it to transparently fall back to the software implementation provided by the window system precisely for video cards lacking hardware support. By doing so, the thin-client computing system allows the simplicity of the client while utilizing the typically faster server CPU to perform the software rendering. In contrast, thin-client systems that push functionality to the client may need to perform the software rendering using the limited resources of the client computer.

Translation Layer

Thin-client computing systems in accordance with one or more embodiments of the invention utilize a virtual display approach to efficiently and transparently intercept application display commands and translate them efficiently into low-level commands.

As the window server processes application requests, the thin-client computing system intercepts display commands and translates the result into its own commands. By translating at this point, the thin-client computing system can use semantic information available about the command (which is lost once processing is finished), to identify which commands should be used. In particular, the system can know what display primitives are used, instead of attempting to infer those primitives after the fact. Translation in many cases becomes a simple one-to-one mapping from display command to the respective system command. For example, a fill operation to color a region of the screen a given color can be easily mapped to a SFILL command.

Decoupling the processing of application display commands and their network transmission allows thin-client computing systems in accordance with one or more embodiments of the invention to aggregate small display updates into larger ones before they are sent to the client, which is helpful in many situations. For example, sending a display update for rendering a single character can result in high overhead when there are many small display updates being generated. Similarly, some application display commands can result in many small display primitives being generated at the display device layer. Rasterizing a large image is often done by rendering individual scan lines. The cost of individually processing and sending scan lines can degrade system performance when an application does extensive image manipulation.

Thin-client computing systems in accordance with one or more embodiments of the invention preserve command semantics throughout its processing of application display commands and manipulation of the resulting system commands. Since the system commands are not necessarily immediately dispatched as they are generated by the server, they should be correctly queued and their semantic information preferably preserved throughout the command's lifetime. For example, it is not uncommon for regions of display data to be copied and manipulated. If copying from one display region to another is done by simply copying the raw pixel values, the original command semantics will be lost in the copied region. If the thin-client computing system commands were reduced to raw pixels, semantic information regarding those commands is lost and it may become difficult to revert back to the original commands to efficiently transmit them over the network.

The thin-client computing system's virtual video device translation layer in accordance with one or more embodiments of the invention builds on these design principles by utilizing two basic objects: the protocol command object, and the command queue object. Protocol command objects, or just command objects, can be implemented in an object-oriented fashion. They are based on a generic interface that allows the thin-client computing system server to operate on the commands, without having to know each command's specific details. On top of this generic interface, each protocol command provides its own concrete implementation.

As previously mentioned, translated commands are not necessarily instantly dispatched to the client. Instead, depending on where drawing occurs and current conditions in the system, commands normally can be stored and groups of commands can be manipulated as a single entity. To handle command processing, the thin-client computing system in accordance with one or more embodiments of the invention includes a command queue. A command queue is a queue where commands drawing to a particular region are ordered according to their arrival time. The command queue keeps track of commands affecting its draw region, and provides that only those commands relevant to the current contents of the region are in the queue. As application drawing occurs, the contents of the region may be overwritten. In the same manner, as commands are generated in response to these new draw operations, they may overwrite existing commands either partially or fully. As commands are overwritten they may become irrelevant, and thus are evicted from the queue. Command queues provide a mechanism for the thin-client computing system to manage groups of commands as a single entity. For example, queues can be merged and the resulting queue will maintain the queue properties automatically.

To provide correct drawing as commands are overwritten, the queue can distinguish among three types of commands based on how they overwrite and are overwritten by other commands: complete, partial, and transparent. Partial commands are opaque commands that can be partially or completely overwritten by other commands. Complete commands are opaque commands that can only be completely overwritten. Transparent commands are commands that depend on commands previously executed and do not overwrite commands already in the queue. The command queue can provide that the overlap properties of each command type are preserved at all times.

Offscreen Drawing

Current graphic applications can use a drawing model where the user interface is prepared using offscreen video memory, that is, the interface is computed offscreen and copied onscreen only when it is ready to present to the user. This idea is similar to the double- and triple-buffering methods used in video and 3D-intensive applications. Though this practice provides the user with a more pleasant experience on a regular local desktop client, it can pose a serious performance problem for thin-client systems. Thin-client systems typically ignore all offscreen commands since they do not directly result in any visible change to the frame buffer. Only when offscreen data are copied onscreen does the thin-client server send a corresponding display update to the client. However, all semantic information regarding the offscreen data has been lost at this point and the server must resort to using raw pixel drawing commands for the onscreen display update. This can be very bandwidth-intensive if there are many offscreen operations that result in large onscreen updates. Even if the updates can be successfully compressed using image compression algorithms, these algorithms can be computationally expensive and would impose additional load on the server.

To deliver effective performance for applications that use offscreen drawing operations, thin-client computing systems in accordance with one or more embodiments of the invention provide a translation optimization that tracks drawing commands as they occur in offscreen memory. The server then sends only those commands that affect the display when offscreen data are copied onscreen. The thin-client computing system can implement this by keeping a command queue for each offscreen region where drawing occurs. When a draw command is received by the thin-client computing system with an offscreen destination, a system protocol command object is generated and added to the command queue associated with the destination offscreen region. The command queue is used so that only relevant commands are stored for each offscreen region, while allowing new commands to be merged with existing commands of the same kind that draw next to each other. The thin-client computing system's offscreen awareness mechanism also accounts for applications that create a hierarchy of offscreen regions to help them manage the drawing of their graphical interfaces. Smaller offscreen regions can be used to draw simple elements, which can be then combined with larger offscreen regions to form more complex elements. This can be accomplished by copying the contents of one offscreen region to another.

To preserve display content semantics across these copy operations, the thin-client computing system in accordance with one or more embodiments of the invention can mimic the process by copying the group of commands that draw on the source region to the destination region's queue and modifying them to reflect their new location. The commands cannot simply be moved from one queue to the other since an offscreen region may be used multiple times as source for a copy.

When offscreen data are copied onscreen, the thin-client computing system in accordance with one or more embodiments of the invention executes the queue of display commands associated with the respective offscreen region. Because the display primitives in the queue are already encoded as the system commands, the thin-client computing system's execution stage normally entails little more than extracting the relevant data from the command's structure and passing it to the functions in charge of formatting and outputting the system protocol commands to be sent to the client. The system can thereby behave similarly to a local desktop client that transfers pixel data from offscreen to onscreen memory.

In monitoring offscreen operations, the thin-client computing system can incur some tracking and translation overhead compared to systems that completely ignore offscreen operations. However, the dominant cost of offscreen operations is the actual drawing that occurs, which is the same regardless of whether the operations are tracked or ignored. As a result, the system's offscreen awareness can generally impose only negligible overhead and can yield substantial improvements in overall system performance.

Audio/Video Support

In accordance with one or more further embodiments, the thin-client computing system provides further enhanced support for video delivery to client devices.

From video conferencing and presentations to movie and music entertainment, multimedia applications play an everyday role in desktop computing. However, existing thin-client platforms provide insufficient support for multimedia applications, and in particular for video delivery to the client. Video delivery imposes rather high requirements on the underlying virtual display architecture. If the video is completely decoded by applications on the server, there is little the thin-client server can do to provide a scalable solution. Real-time re-encoding of the video data is computationally expensive, even with modern high end server CPUs. At the same time, delivering 24 fps of raw RGB data can rapidly overwhelm the capacity of a typical network. Further hampering the ability of thin-client systems to support video playback is the lack of well-defined application interfaces for video decoding.

Most video players use ad-hoc, unique methods and architectures for video decoding, and providing support in this environment would require prohibitive per-application modifications. While full video decoding in desktop computers is still confined to the realm of software applications, video hardware manufacturers have been slowly adding hardware acceleration capabilities to video cards for specific stages of the decoding process. For example, the ability to do hardware color space conversion and scaling (the last stage of the decoding process) is widely present in today's commodity video cards. To allow applications to take advantage of these advancements, interfaces have been created in display systems that allow video device drivers to expose their hardware capabilities back to the applications.

Using a virtual device driver approach, thin-client computing systems in accordance with one or more embodiments of the invention can provide a virtual "bridge" between the remote client hardware and the local applications, and allow applications to transparently use the hardware capabilities of the client to perform video playback across the network.

The thin-client computing system in accordance with one or more embodiments of the invention can support the transmission of video data using widely supported YUV pixel formats. A wide range of YUV pixel formats exist that provide efficient encoding of video content. For example, the preferred pixel format in the MPEG decoding process is YV12, which allows normal true color pixels to be represented with only 12 bits. YUV formats are able to efficiently compress RGB data without loss of quality by taking advantage of the human eye's ability to better distinguish differences in brightness than in color. When using YUV, the client can simply transfer the data to its hardware, which automatically does color space conversion and scaling. Hardware scaling decouples the network transfer requirements of the video from the size at which it is viewed. In other words, playing back a video at full screen resolution does not incur any additional overhead over playing it at its original size, because the client hardware transparently transforms the stream to the desired view size.

The thin-client computing system's video architecture can be built around the notion of video stream objects. Each stream object can represent a video being displayed. All streams can share a common set of characteristics that allow the thin-client computing system to manipulate them such as their format, position on the screen, and the geometry of the video. In addition, each stream encapsulates information and state for its respective format. The server can use its translation architecture to generally seamlessly translate from application requests to video commands that are forwarded to the client. Additional protocol messages can be used to manipulate video streams, and they allow operations such as initialization and tearing down of a video stream, and manipulation of the stream's position and size.

Audio streams are not as resource intensive as video streams and the thin-client computing system in accordance with one or more embodiments of the invention can support audio by applying the virtual display driver approach to the audio device to create a virtual audio driver that takes audio input, packetizes it, and sends it over the network to a client device to display.

By operating at the device layer, the thin-client computing system can provide transparent support for audio applications that can use many different audio libraries. The thin-client computing system timestamps both audio and video data at the server to ensure they are delivered to the client with the same synchronization characteristics present at the server.

Command Scheduling

Thin-client computing systems in accordance with one or more embodiments of the invention can schedule commands to be sent from server to client preferably with interactive responsiveness and latency tolerance as a top priority. The thin-client computing system can maintain a per-client command buffer based on the command queue structure described above to keep track of commands that need to be sent to the client.

While the client buffer maintains command ordering based on arrival time, the system does not necessarily follow this ordering when delivering commands over the network. Instead, alongside the client buffer, the thin-client computing system in accordance with one or more embodiments of the invention can provide a multi-queue Shortest-Remaining-Size-First (SRSF) preemptive scheduler, analogous to Shortest-Remaining-Processing-Time (SRPT). SRPT can reduce mean response time, a primary goal in improving the interactivity of a system.

The size of a command refers to its size in bytes, not its size in terms of the number of pixels it updates. The thin-client computing system uses remaining size instead of the command's original size to shorten the delay between delivery of segments of a display update and to reduce artifacts due to partially sent commands. Commands can be sorted in multiple queues in increasing order with respect to the amount of data needed to deliver them to the client. Each queue represents a size range, and commands within the queue are ordered by arrival time.

In accordance with one particular embodiment, 10 queues with powers of 2 representing queue size boundaries are used. When a command is added to the client's command buffer, the scheduler chooses the appropriate queue to store it. The commands are then flushed in increasing queue order.

Reordering of commands is possible with correct final output provided as long as any dependencies between a command and commands issued before it are handled correctly. To demonstrate how the thin-client computing system's scheduler provides correct drawing, partial, complete, and transparent commands are distinguished. Opaque commands completely overwrite their destination region. Therefore, dependency problems can arise after reordering only if an earlier-queued command can draw over the output of a later-queued command. However, this situation cannot occur for partial commands because the command queue provides that no overlap exists among these types of commands. Furthermore, since complete commands are typical of various types of fills such as solid fills, their size is constantly small and they are guaranteed to end up in the first scheduler queue. Since each queue is ordered by arrival time, it is not possible for these commands to overwrite later similar commands.

On the other hand, transparent commands can be handled more carefully because they explicitly depend on the output of commands drawn before them. To provide efficient scheduling, the thin-client computing system in accordance with one or more embodiments of the invention can schedule a transparent command T using a two step process. First, dependencies are found by computing the overlap between the output region of T and the output region of existing buffered commands. T will depend on all those commands with which it overlaps. Second, from the set of dependencies, the largest command L is chosen, and the new command is added to the back of the queue where L currently resides. As queues are flushed in increasing order, the thin-client computing system's approach provides that all commands upon which T depends will have been completely drawn before T itself is sent to the client. Although more sophisticated approaches could be used to allow the reordering of transparent commands, their additional complexity might outweigh any potential benefits to the performance of the system.

In addition to the queues for normal commands, the scheduler can have a real-time queue for commands with high interactivity needs. Commands in the real-time queue take priority and preempt commands in the normal queues. Real-time commands are small to medium-sized and are issued in direct response to user interaction with the applications. For example, when the user clicks on a button or enters keyboard input, she expects immediate feedback from the system in the form of a pressed button image. Because a video driver does not have a notion of a button or other high-level primitives, the thin-client computing system in accordance with one or more embodiments of the invention can define a small-sized region around the location of the last received input event. By marking updates that overlap these regions as real-time and delivering them sooner as opposed to later, the thin-client computing system can improve the user-perceived responsiveness of the system.

In accordance with one or more further embodiments of the invention, the thin-client computing system sends commands to the client using a server-push architecture, where display updates are pushed to the client as soon as they are generated. In contrast to the client-pull model used by popular systems such as VNC (Virtual Network Computing) and GoToMyPC, server-push improves display response time by obviating the need for a round trip delay on every update. This is particularly significant for display-intensive applications such as video playback since updates are generated faster than the rate at which the client can send update requests back to the server. Furthermore, a server-push model in accordance with one or more embodiments of the invention reduces the impact of network latency on the responsiveness of the system because it requires no client-server synchronization, whereas a client-driven system has an update delay of at least half the round-trip time in the network.

Although a push mechanism can outperform client-pull systems, a server blindly pushing data to clients can quickly overwhelm slow or congested networks and slowly responding clients. In this situation, the server may have to block or buffer updates. If updates are not buffered carefully and the state of the display continues to change, outdated content might be sent to the client before relevant updates can be delivered. Blocking can have potentially worse effects. Display systems are commonly built around a monolithic core server that manages display and input events, and where display drivers are integrated. If the video device driver blocks, the core display server also blocks. As a result, the system becomes unresponsive since neither application requests nor user input events can be serviced. In display systems where applications send requests to the window system using IPC mechanisms, blocking may eventually cause applications to also block after the IPC buffers are filled.

The thin-client computing system server provides correct buffering and low overhead display update management by using its command queue-based client buffer. The client buffer automatically evicts outdated commands. the thin-client computing system periodically attempts to flush the buffer using its SRSF scheduler in a two stage process. First, each command in the buffer's queue is committed to the network layer by using the command's flush handler. Since the server can detect if it will block when attempting to write to a socket, it can postpone the command until the next flush period. Second, to protect the server from blocking on large updates, a command's flush handler provides non-blocking operation during the commit by breaking large commands into smaller updates.

When the handler detects that it cannot continue without blocking, it reformats the command to reflect the portion that was committed and informs the server to stop flushing the buffer. Commands are not broken up in advance to reduce overhead and allow the system to adapt to changing conditions.

Supporting Heterogeneous Displays

In accordance with one or more further embodiments of the invention, thin-client computing systems can decouple a session's original frame buffer size, from the size at which a particular client may view it. In this way, the thin-client computing system can enable access from a variety of devices by supporting variable client display sizes and dynamic resizing. For instance, to view a desktop session through a small-screen mobile device such as a PDA, the thin-client computing system can initially present a zoomed-out version of the user's desktop, from where the user can zoom in on particular sections of the display. Unlike some other thin-client systems, display resizing in accordance with one or more embodiments of the invention can be fully supported by the server.

After a client reports its screen size to the server, subsequent updates can be automatically resized by the server to fit in the client's smaller viewport or display. When the user zooms in on the desktop, the client presents a temporary magnified view of the desktop while it requests updated content from the server.

The server updates are needed when the display size increases, because the client has only a small-size version of the display, with not enough content to provide an accurate view of the desktop. Server resize support is designed to reduce processing and network overhead while maintaining display quality and client simplicity. For this reason, resizing can be supported differently for each protocol command. RAW updates can be easily resized because they consist of pure pixel data which can be reliably resampled, and more importantly, the bandwidth savings are significant. Similarly for PFILL updates the tile image is resized. On the other hand, BITMAP updates generally cannot be resized without incurring significant loss of display information and generating display artifacts. Traditionally, anti-aliasing techniques are used to reduce the loss of information from the downsize operation. However, anti-aliasing requires the use of intermediate pixel values that bitmap data cannot represent. In this case, BITMAP updates are converted to RAW and resampled by the server. While this may increase bandwidth usage, requiring the client to do resizing would be prohibitively expensive. Finally, resizing SFILL updates represents no savings with respect to bandwidth or computation, and therefore they are sent unmodified.

Thin-client systems in accordance with one or more embodiments of the invention can provide substantial performance benefits by leveraging server resources and reducing bandwidth consumption, outperforming the client-only support present in other thin-client systems. Furthermore, since thin-client computing systems in accordance with one or more embodiments of the invention can use a powerful server CPU to do most of the resize work, it can use high quality resampling algorithms to provide superior display content to the user.

Thin-Client System Implementation Examples

A variety of server and client implementations are possible for thin-client systems in accordance with one or more embodiments of the invention. In one exemplary embodiment, a thin-client system server can be implemented in Linux as a video device driver that works with existing open source X server implementations, including XFree86 4.3, 4.4, and X.org 6.8. The clients can be implemented, e.g., in a simple X application, a Java client (both as a standalone application and a web browser applet), a Windows client, and a Windows PDA client, demonstrating client portability and simplicity. The thin-client computing system can seamlessly hook into X's existing driver infrastructure, and generally no changes are needed to applications or the window system. XFree86 and derived implementations are designed around a single-user workstation model where a server has exclusive access to the computer's display hardware, and multiple server instances are not allowed to be active simultaneously.

Because the thin-client computing system server does not access local hardware, the thin-client computing system modifies the window server's behavior from within the video driver to allow multiple servers to be active at the same time.

RAW commands can be compressed to mitigate their impact on the network. By way of example, the zlib's implementation of the DEFLATE algorithm can be used for this purpose. A simplified version of Fant's resampling algorithm, which produces high quality, anti-aliased results with very low overhead can be used, e.g., to support resizing. To provide video support, the thin-client computing system can, e.g., leverage the standard XVideo extension by implementing the necessary XVideo device driver hooks. The thin-client computing system can export the YV12 format to applications, which is selected not only for its intrinsic compression characteristics, but also for the wide range of applications supporting it, and its use as one of the preferred formats in MPEG codecs. For audio support, a virtualized ALSA audio driver implemented as a kernel module can be used to intercept audio data. The thin-client computing system audio driver can utilize ALSA's driver interfaces and multiplex its resources across multiple system users. Applications can interact with the driver using ALSA's audio library. The driver can work in tandem with a per client daemon, which can be automatically signaled as audio data becomes available.

For improved security, the thin-client computing system preferably encrypts all traffic using, e.g., RC4, a streaming cipher particularly suited for the kind of traffic prevalent in thin-client environments. Although block ciphers can have a significant effect in the performance of the system, the cost of RC4 is generally low, and the benefits generally outweigh any minor overhead in overall system performance.

Authentication can be implemented using the standard UNIX authentication facilities provided by PAM (Pluggable Authentication Modules). The authentication model can require the user to have a valid account on the server system and to be the owner of the session she is connecting to. To support multiple users collaborating in a screen-sharing session, the authentication model can be extended to allow host users to specify a session password, that is then used by peers connecting to the shared session.

The server and client are preferably implemented in software, and accordingly one of the preferred implementations of the invention is as a set of instructions (program code) in a code module resident in the random access memory of the computer. Until required by the computer, the set of instructions may be stored in another computer memory, e.g., in a hard disk drive, or in a removable memory such as an optical disk (for eventual use in a CD ROM) or floppy disk (for eventual use in a floppy disk drive), or downloaded via the Internet or some other computer network. In addition, although the various methods described are conveniently implemented in a computer selectively activated or reconfigured by software, one of ordinary skill in the art would also recognize that such methods may be carried out in hardware, in firmware, or in more specialized apparatus constructed to perform the specified method steps.

Having described preferred embodiments of the present invention, it should be apparent that modifications can be made without departing from the spirit and scope of the invention.

Method claims set forth below having steps that are numbered or designated by letters should not be considered to be necessarily limited to the particular order in which the steps are recited.

The invention claimed is:

1. A method of executing an application remotely on a server computer for a client computer in a computer network, the method comprising:
   (a) receiving at the server computer user input from the client computer associated with the application;
   (b) executing the application at the server computer, including:
      (i) processing display commands of the application to generate display primitives;
      (ii) translating the display primitives into lower level display commands defining display updates using semantic information of the display primitives and comprising region information identifying at least one of an onscreen region and an offscreen region, the lower level display commands being selected from a predetermined set of lower level display commands;
      (iii) aggregating a plurality of lower level display commands translated in (ii); and
      (iv) ordering said plurality of lower level display commands into two or more separate command queues based at least in part on the region information of the lower level display commands, each command queue associated with a given onscreen region or offscreen region, including at least one separate command queue associated with a given onscreen region and at least one separate command queue associated with a given offscreen region; and
   (c) transmitting the lower level display commands in the two or more separate command queues over the network to the client computer, including transmitting said lower level display commands to the client computer when offscreen data associated with display commands ordered in command queues associated with offscreen regions are to be copied onscreen, the client computer being capable of translating the lower level display commands into hardware calls for causing the client computer to display the display updates.

2. The method of claim 1 further comprising tracking display commands affecting a given display region from new draw operations, and overwriting one or more display commands in one or more of the two or more command queues made irrelevant by the new draw operations.

3. The method of claim 1 further comprising scheduling delivery of said plurality of lower level display commands to the client computer in accordance with the size of each of said lower level display commands, wherein smaller sized commands are sent before larger sized commands.

4. The method of claim 3 wherein scheduling delivery comprises sorting said plurality of lower level display commands into a plurality of queues, each queue associated with a given command size range, and ordering said plurality of lower level display commands in each said queue in accordance with arrival time of said command.

5. A method for displaying information on a thin-client in communication with a network, the method comprising:
   receiving display primitives generated by a window system that processes display commands received from at least one application, the display primitives defining updates to onscreen regions and offscreen regions;
   translating the display primitives into thin-client display commands defining display updates, the thin-client display commands being selected from a predetermined set of lower-level display commands and comprising region information identifying at least one of an onscreen region and an offscreen region;
   storing the thin-client display commands in a plurality of separate region queues based at least in part on the region information of the display commands, each region queue of the plurality of region queues being associated with a particular onscreen or offscreen region, including at least one separate region queue associated with a given onscreen region and at least one separate region queue associated with a given offscreen region; and
   transmitting the thin-client display commands stored in the separate region queues to the thin-client for display, including transmitting the thin-client display commands to the thin-client when offscreen data associated with thin-client display commands stored in region queues associated with offscreen regions are to be copied on screen.

6. The method of claim 5, further comprising storing the thin-client display commands in size-based queues within a region queue of the plurality of region queues based at least in part on a size of the thin-client display commands.

7. The method of claim 6, wherein thin-client display commands in size-based queues corresponding to smaller-sized thin-client display commands are transmitted before thin-client display commands in size-based queues corresponding to larger-sized thin-client display commands.

8. The method of claim 5, further comprising scheduling the transmission of said plurality of lower-level display commands to the thin client based at least in part on a size of each of the thin-client display commands, wherein smaller-sized thin-client display commands are sent before larger-sized thin-client display commands.

9. The method of claim 5, further comprising
storing thin-client display commands designated as real-time display commands in a real-time sub-queue of the plurality of region queues, wherein thin-client display commands in a real-time sub-queue are transmitted with higher priority over thin-client display commands not stored in a real-time sub-queue.

10. The method of claim 5, wherein the storing is further based on the at least one application from which a thin-client display command originated.

11. The method of claim 5, further comprising aggregating a first number of the thin-client display commands into a smaller second number of thin-client display commands prior to the transmitting.

12. The method of claim 5, further comprising overwriting one or more of the thin-client display commands in the region queues made irrelevant by one or more other thin-client display commands.

13. The method of claim 5, wherein the predetermined set of lower-level display commands includes at least one of:
a command to transmit unencoded pixel data to be displayed on a region of a display of the thin client;
a command to instruct the thin client to copy a region of the display from its local frame buffer to another location;
a command to instruct the thin client to fill a significant region of the display with a single color;
a command to instruct the thin client to replicate a tile over a region of the display; and
a command to instruct the thin client to perform a fill of a region of the display using a bitmap as a stipple to apply a foreground or background color.

14. The method of claim 5, wherein said thin-client display commands comprise video commands, and the translating is based at least in part on detected video hardware capabilities of the thin client.

15. The method of claim 5, wherein the plurality of region queues comprises a first queue and a second queue, the first queue being associated with a particular onscreen and the second queue being associated with a particular offscreen region.

16. A non transitory computer-readable medium storing computer-executable instructions that, when executed by a processor, cause the processor to perform a method for displaying information on a thin-client in communication with a network, comprising:
receiving display primitives generated by a window system that processes display commands received from at least one application, the display primitives defining updates to onscreen regions and offscreen regions;
translating the display primitives into thin-client display commands defining display updates, the thin-client display commands being selected from a predetermined set of lower-level display commands and comprising region information identifying at least one of an onscreen region and an offscreen region;
storing the thin-client display commands in a plurality of separate region queues based at least in part on the region information of the display commands, each region queue of the plurality of region queues being associated with a particular onscreen or offscreen region, including at least one separate region queue associated with a given onscreen region and at least one separate region queue associated with a given offscreen region; and
transmitting the thin-client display commands stored in the separate region queues to the thin-client for display, including transmitting the thin-client display commands to the thin-client when offscreen data associated with thin-client display commands stored in region queues associated with offscreen regions are to be copied on screen.

17. The non transitory computer-readable medium of claim 16, the method further comprising storing the thin-client display commands in size-based queues within a region queue of the plurality of region queues based at least in part on a size of the thin-client display commands.

18. The non transitory computer-readable medium of claim 17, wherein thin-client display commands in size-based queues corresponding to smaller-sized thin-client display commands are transmitted before thin-client display commands in size-based queues corresponding to larger-sized thin-client display commands.

19. The non transitory computer-readable medium of claim 16, the method further comprising scheduling the transmission of said plurality of lower-level display commands to the thin client based at least in part on a size of each of the thin-client display commands, wherein smaller-sized thin-client display commands are sent before larger-sized thin-client display commands.

20. The non transitory computer-readable medium of claim 16, the method further comprising storing thin-client display commands designated as real-time display commands in a real-time sub-queue of the plurality of region queues, wherein thin-client display commands in a real-time sub-queue are transmitted with higher priority over thin-client display commands not stored in a real-time sub-queue.

21. The non transitory computer-readable medium of claim 16, wherein the storing is further based on the at least one application from which a thin-client display command originated.

22. The non transitory computer-readable medium of claim 16, the method further comprising aggregating a first number of the thin-client display commands into a smaller second number of thin-client display commands prior to the transmitting.

23. The non transitory computer-readable medium of claim 16, the method further comprising overwriting one or more of the thin-client display commands in the region queues made irrelevant by one or more other thin-client display commands.

24. The non transitory computer-readable medium of claim 16, wherein the predetermined set of lower-level display commands includes at least one of:
a command to transmit unencoded pixel data to be displayed on a region of a display of the thin client;
a command to instruct the thin client to copy a region of the display from its local frame buffer to another location;
a command to instruct the thin client to fill a significant region of the display with a single color;
a command to instruct the thin client to replicate a tile over a region of the display; and
a command to instruct the thin client to perform a fill of a region of the display using a bitmap as a stipple to apply a foreground or background color.

25. The non transitory computer-readable medium of claim 16, wherein said thin-client display commands comprise video commands, and the translating is based at least in part on detected video hardware capabilities of the thin client.

26. The non transitory computer-readable medium of claim 16, wherein the plurality of region queues comprises a first queue and a second queue, the first queue being associated with a particular onscreen and the second queue being associated with a particular offscreen region.

27. A system for displaying information on a thin-client in communication with a network, comprising:
   a virtual device driver that:
      receives display primitives generated by a window system that processes display commands received from at least one application, the display primitives defining updates to onscreen regions and offscreen regions;
      translates the display primitives into thin-client display commands defining display updates, the thin-client display commands being selected from a predetermined set of lower-level display commands and comprising region information identifying at least one of an onscreen region and an offscreen region; and
   a command scheduler in communication with the virtual device driver that:
      receives the thin-client display commands from the virtual device driver;
      stores the thin-client display commands in a plurality of separate region queues based at least in part on the region information of the display commands, each region queue of the plurality of region queues being associated with a particular onscreen or offscreen region, including at least one separate region queue associated with a given onscreen region and one separate region queue associated with a given offscreen region; and
      transmits the thin-client display commands stored in the separate region queues to the thin-client for display, including transmitting the thin-client display commands to the thin-client when offscreen data associated with thin-client display commands stored in region queues associated with offscreen regions are to be copied on screen.

28. The system of claim 27, wherein the command scheduler further stores the thin-client display commands in size-based queues within a region queue of the plurality of region queues based at least in part on a size of the thin-client display commands.

29. The system of claim 28, wherein thin-client display commands in size-based queues corresponding to smaller-sized thin-client display commands are transmitted before thin-client display commands in size-based queues corresponding to larger-sized thin-client display commands.

30. The system of claim 27, wherein the command scheduler further schedules the transmission of said plurality of lower-level display commands to the thin client based at least in part on a size of each of the thin-client display commands, wherein smaller-sized thin-client display commands are sent before larger-sized thin-client display commands.

31. The system of claim 27, wherein the command scheduler further stores thin-client display commands designated as real-time display commands in a real-time sub-queue of the plurality of region queues and transmits the thin-client display commands in a real-time sub-queue with higher priority over thin-client display commands not stored in a real-time sub-queue.

32. The system of claim 27, wherein the storing is further based on the at least one application from which a thin-client display command originated.

33. The system of claim 27, wherein the command scheduler further aggregates a first number of the thin-client display commands into a smaller second number of thin-client display commands prior to the transmitting.

34. The system of claim 27, wherein the command scheduler further overwrites one or more of the thin-client display commands in the region queues made irrelevant by one or more other thin-client display commands.

35. The system of claim 27, wherein the predetermined set of lower-level display commands includes at least one of:
   a command to transmit unencoded pixel data to be displayed on a region of a display of the thin client;
   a command to instruct the thin client to copy a region of the display from its local frame buffer to another location;
   a command to instruct the thin client to fill a significant region of the display with a single color;
   a command to instruct the thin client to replicate a tile over a region of the display; and
   a command to instruct the thin client to perform a fill of a region of the display using a bitmap as a stipple to apply a foreground or background color.

36. The system of claim 27, wherein said thin-client display commands comprise video commands, and the translating is based at least in part on detected video hardware capabilities of the thin client.

37. The system of claim 27, wherein the plurality of region queues comprises a first queue and a second queue, the first queue being associated with a particular onscreen and the second queue being associated with a particular offscreen region.

* * * * *

UNITED STATES PATENT AND TRADEMARK OFFICE
CERTIFICATE OF CORRECTION

| | | |
|---|---|---|
| PATENT NO. | : 7,730,157 B2 | Page 1 of 1 |
| APPLICATION NO. | : 11/221475 | |
| DATED | : June 1, 2010 | |
| INVENTOR(S) | : Ricardo Baratto et al. | |

It is certified that error appears in the above-identified patent and that said Letters Patent is hereby corrected as shown below:

On column 1, after line 12, please add:

--STATEMENT REGARDING FEDERALLY
SPONSORED RESEARCH OR DEVELOPMENT

This invention was made with government support under Grant Nos. NSF CCR0093047 and NSF CCR0219943 awarded by the National Science Foundation. The government has certain rights in the invention.--

Signed and Sealed this
Twelfth Day of February, 2013

Teresa Stanek Rea
*Acting Director of the United States Patent and Trademark Office*